US012520585B2

(12) United States Patent
Cao et al.

(10) Patent No.: US 12,520,585 B2
(45) Date of Patent: Jan. 6, 2026

(54) ARRAY SUBSTRATE AND DISPLAY PANEL

(71) Applicant: HKC CORPORATION LIMITED, Shenzhen (CN)

(72) Inventors: Junhong Cao, Shenzhen (CN); Lidan Ye, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 19/004,523

(22) Filed: Dec. 30, 2024

(65) Prior Publication Data

US 2025/0228001 A1   Jul. 10, 2025

(30) Foreign Application Priority Data

Jan. 10, 2024   (CN) .......................... 202410036219.0

(51) Int. Cl.
| | |
|---|---|
| *G09G 3/20* | (2006.01) |
| *H10D 86/40* | (2025.01) |
| *H10D 86/60* | (2025.01) |
| *G02F 1/167* | (2019.01) |
| *G02F 1/1685* | (2019.01) |

(52) U.S. Cl.
CPC ........... *H10D 86/441* (2025.01); *H10D 86/60* (2025.01); *G02F 1/167* (2013.01); *G02F 1/1685* (2019.01)

(58) Field of Classification Search
CPC ...... G09G 3/20; G09G 3/2092; G09G 3/2096; G09G 3/3611; G09G 2300/0426; G02F 1/1345; G02F 1/13452; G02F 1/167; G02F 1/1685; G02F 2201/56; H10D 86/60; H10D 86/441
See application file for complete search history.

(56) References Cited

U.S. PATENT DOCUMENTS

| | | | | |
|---|---|---|---|---|
| 10,204,932 | B2 * | 2/2019 | Yang | H01L 21/77 |
| 11,004,870 | B2 * | 5/2021 | Lee | H10D 30/6758 |
| 12,408,549 | B2 * | 9/2025 | Zhang | H10K 59/1213 |
| 2018/0267378 | A1 * | 9/2018 | Li | H10D 86/60 |
| 2024/0136365 | A1 * | 4/2024 | Cao | G02F 1/16766 |

FOREIGN PATENT DOCUMENTS

| | | | | |
|---|---|---|---|---|
| CN | 105093757 A | | 11/2015 | |
| CN | 107680976 A | | 2/2018 | |
| CN | 117037672 A | * | 11/2023 | ........... G09G 3/2074 |
| TW | 1699586 B | * | 7/2020 | |

* cited by examiner

*Primary Examiner* — Joe H Cheng

(57) ABSTRACT

An array substrate includes a base, an integrated driver chip, multiple data lines, scan lines, first connection lines, second connection lines, and third connection lines. The third connection lines are disposed in a different layer than the scan lines. Two ends of each first connection line are connected to the integrated driver chip the corresponding data line, respectively. Two end of each second connection line are connected to the integrated driver chip and the corresponding scan line, respectively. Two ends of each third connection line are connected to the integrated driver chip and the other end of the corresponding scan line, respectively. Each scan line is connected to one respective second connection line and one respective third connection line. Each second connection line is entirely disposed in the non-display area. Each third connection line is partially disposed in the fan-out area, and partially disposed in the display area.

20 Claims, 7 Drawing Sheets

ARRAY SUBSTRATE AND DISPLAY PANEL

CROSS-REFERENCE TO RELATED APPLICATIONS

This application claims the priority and benefit of Chinese patent application number 2024100362190, titled "Array Substrate and Display Panel" and filed Jan. 10, 2024 with China National Intellectual Property Administration, the entire contents of which are incorporated herein by reference.

TECHNICAL FIELD

This application relates to the field of display technology, and more particularly relates to an array substrate and a display panel.

BACKGROUND

The description provided in this section is intended for the mere purpose of providing background information related to the present application but doesn't necessarily constitute prior art.

With the development of digital technology, more and more display devices are entering people's lives, such as electronic paper (EP). An electronic paper display panel can maintain display for a long time when the power is off, and have the advantages of lightweight, thinness, low power consumption, and simple process, so they are becoming more and more popular.

The electronic paper display panel may have a narrow bezel or even no bezel, so it is impossible to achieve dual-sided drive in the array substrate manufacturing process, which makes it easy to break up the scan line after being damaged by static electricity. Therefore, how to make the electronic paper display panel realize dual-sided driving structure while further reducing the bezel area and preventing interference between signals is an urgent problem to be solved.

SUMMARY

In view of the above, it is one purpose of the present application to provide an array substrate and a display panel that can realize dual-sided driving while reducing the size of the non-display area and preventing interference between signals.

The present application discloses an array substrate. The array substrate is divided into a display area and a non-display area. The array substrate further includes a base, and at least one integrated driver chip, multiple data lines, and multiple scan lines that are arranged on the base. The integrated driver chip is located in the non-display area. The multiple data lines and multiple scan lines are arranged in a criss-cross pattern in the display area, and are all connected to the integrated driver chip. The integrated driver chip is located in a length direction of the data lines. The array substrate further includes multiple first connection lines, multiple second connection lines, and multiple third connection lines. The third connection lines are disposed in a different layer from the scan lines. One end of each first connection line is connected to the integrated driver chip, and the other end is connected to the respective data line. One end of each second connection line is connected to the integrated driver chip, and the other end is connected to one end of the respective scan line. One end of the third connection line is connected to the integrated driver chip, and the other end is connected to the other end of the respective scan line. Each scan line is connected to one second connection line and one third connection line.

The non-display area includes a fan-out area. The fan-out area is located between the integrated driver chip and the display area. The second connection lines are each entirely located in the non-display area. A part of the third connection line is located in the fan-out area, and the other part is located in the display area.

In some embodiments, the third connection line includes a fan-out portion and an in-plane portion. The two ends of the fan-out portion are connected to the integrated driver chip and the in-plane portion respectively. The in-plane portion is connected to the corresponding scan line through a via hole. The fan-out portion is located in the fan-out area. The in-plane portion is located in the display area.

The in-plane portion of each third connection line is equal in length. The in-plane portion of the third connection line is the same as the length of the data line.

The array substrate further includes a floating line. The floating line is arranged on the base and is located in the display area. The floating line is parallel to the data line. The floating line is located between two adjacent data lines, and the distance between the floating line and the adjacent data line is d2.

The in-plane portion of the third connection line is arranged in parallel with the data line, and the in-plane portion is located between two adjacent data lines, and the distance between the in-plane portion and the adjacent data line is d3, where d2 is equal to d3;

Only the floating line or only the in-plane portion of the third connection line is disposed between two adjacent data lines.

In some embodiments, the in-plane portions of the plurality of third connection lines are arranged equidistantly within the display area.

In some embodiments, the array substrate includes two integrated driver chips, namely a first sub-integrated driver chip and a second sub-integrated driver chip. The multiple second connection lines are divided into second left connection lines and second right connection lines. The multiple third connection lines are divided into third left connection lines and third right connection lines.

One end of the second right connection line is connected to the second sub-integrated driver chip, and the other end is connected to one end of a scan line of an odd row. One end of the third left connection line is connected to the first sub-integrated driver chip, and the other end is connected to the other end of the scan line of the odd row. Each scan line of the odd row is connected to one second right connection line and one third left connection line.

One end of the second left connection line is connected to the first sub-integrated driver chip, and the other end is connected to one end of the scan line of an even-numbered row. One end of the third right connection line is connected to the second sub-integrated driver chip, and the other end is connected to the other end of the scan line of the even-numbered row.

Each scan line of an even-numbered row is connected to one second left connection line and one third right connection line.

In some embodiments, the length of the third left connection line connected to the scan line of the previous odd row is greater than the length of the third left connection line connected to the scan line of the current odd row.

The length of the third right connection line connected to the scan line of the previous even row is greater than the length of the third right connection line connected to the scan line of the current even row.

In some embodiments, the sum of the lengths of the second connection line and the third connection line that are connected to both ends of the scan line of the current row is d1.

The sum of the lengths of the second connection line and the third connection line that are connected to both ends of the scan line of any other row is d2. The difference between d1 and d2 is 0-0.5 mm.

In some embodiments, the third connection line includes a fan-out portion and an in-plane portion. The two ends of the fan-out portion are respectively connected to the integrated driver chip and the in-plane portion. The in-plane portion is connected to the corresponding scan line through a via hole. The fan-out portion is located in the fan-out area. The in-plane portion is located in the display area.

The fan-out portion of the third connection line is located between two adjacent first connection lines. The in-plane portion of the third connection line is located between two adjacent data lines.

In some embodiments, the third connection line is disposed in a different layer than the first connection line. A projection of the fan-out portion of the third connection line on the base overlaps or coincides with a projection of the first connection line on the base.

A projection of the in-plane portion of the third connection line on the base overlaps or coincides with a projection of the data line on the base.

In some embodiments, the array substrate includes a first metal layer, a first insulating layer, a second metal layer, a second insulating layer, a third metal layer, and a third insulating layer that are sequentially deposited on the base.

The third connection line is located in the first metal layer. The scan line is located in the second metal layer. The second connection line is located in the second metal layer. The data line is located in the third metal layer. The first connection line is located in the third metal layer.

The array substrate further includes a plurality of metal line segments, and the metal line segments are located in the second metal layer. Each metal line segment is located between two adjacent scan lines and is not connected to the scan lines. A projection of the third connection line on the base overlaps or coincides with a projection of the metal line segment on the base.

The present application further discloses a display panel. The display panel includes an opposing substrate and the array substrate described above. The opposing substrate is arranged opposite to the array substrate.

Compared with the solution that the connection lines on both sides of the scan line of the array substrate are located in the non-display area, the present application disposes the connection line for the other part of the scan line, namely the third connection line, in the fan-out area and the display area, thus reducing the size of the non-display area of the array substrate, thereby achieving an ultimate borderless effect. By disposing the connection line for one part of the scan line, namely the second connection line, in the non-display area, it is avoided that all the connection lines are located in the fan-out area and the display area to reduce the interference with the first connection lines, thus ensuring the normal transmission of signals.

BRIEF DESCRIPTION OF DRAWINGS

The accompanying drawings are used to provide a further understanding of the embodiments according to the present application, and constitute a part of the specification. They are used to illustrate the embodiments according to the present application, and explain the principle of the present application in conjunction with the text description. Apparently, the drawings in the following description merely represent some embodiments of the present disclosure, and for those having ordinary skill in the art, other drawings may also be obtained based on these drawings without investing creative efforts. A brief description of the accompanying drawings is provided as follows.

Figure 1:
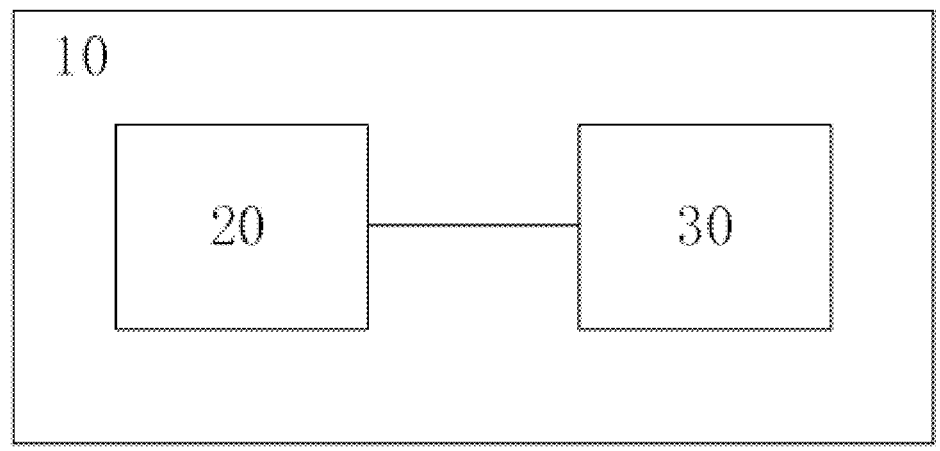
FIG. 1 is a schematic diagram of a display panel according to an embodiment of the present application.

IN THE DRAWINGS 10, display panel; 20, opposing substrate; 30, array substrate; 31, display area; 32, non-display area; 33, fan-out area; 100, base; 110, first metal layer; 120, first insulating layer; 130, second metal layer; 140, second insulating layer; 150, third metal layer; 160, third insulating layer; 200, integrated driver chip; 210, first sub-integrated driver chip; 220, second sub-integrated driver chip; 310, data line; 320, scan line; 400, first connection line; 500, second connection line; 510, second left connection line; 520, second right connection line; 600, third connection line; 610, fan-out portion; 620, in-plane portion; 630, third left connection line; 640, third right connection line; 700, floating line; 800, metal line segment; 810, main body; 820, first side wall; 830, second side wall; 900, via hole.

DETAILED DESCRIPTION OF EMBODIMENTS

It should be understood that the terms used herein, the specific structures and function details disclosed herein are intended for the mere purposes of describing specific embodiments and are representative. However, this application may be implemented in many alternative forms and should not be construed as being limited to the embodiments set forth herein.

As used herein, terms "first", "second", or the like are merely used for illustrative purposes, and shall not be construed as indicating relative importance or implicitly indicating the number of technical features specified. Thus, unless otherwise specified, the features defined by "first" and "second" may explicitly or implicitly include one or more of such features. Terms "multiple", "a plurality of", and the like mean two or more. Term "comprising", "including", and any variants thereof mean non-exclusive inclusion, so that one or more other features, integers, steps, operations, units, components, and/or combinations thereof may be present or added.

In addition, terms "center", "transverse", "up", "down", "left", "right", "vertical", "horizontal", "top", "bottom", "inside", "outside", or the like are used to indicate orientational or relative positional relationships based on those illustrated in the drawings. They are merely intended for simplifying the description of the present disclosure, rather than indicating or implying that the device or element referred to must have a particular orientation or be constructed and operate in a particular orientation. Therefore, these terms are not to be construed as restricting the present disclosure.

Furthermore, as used herein, terms "installed on", "mounted on", "connected to", "coupled to", "connected with", and "coupled with" should be understood in a broad sense unless otherwise specified and defined. For example, they may indicate a fixed connection, a detachable connection, or an integral connection. They may denote a mechanical connection, or an electrical connection. They may denote a direct connection, a connection through an intermediate, or an internal connection between two elements. For those of ordinary skill in the art, the specific meanings of the above terms as used in the present application can be understood depending on specific contexts.

Hereinafter this application will be described in further detail with reference to the accompanying drawings and some optional embodiments.

FIG. 1 is a schematic diagram of a display panel according to an embodiment of the present application. As shown in FIG. 1, the present application discloses a display panel 10. The display panel 10 includes an opposing substrate 20 and an array substrate 30. The opposing substrate 20 is arranged opposite to the array substrate 30.

The display panel 10 includes, for example, an electronic paper display panel 10, a TN (Twisted Nematic) display panel 10, an IPS (In-Plane Switching) display panel 10, a VA (Vertical Alignment) display panel 10, and an MVA (Multi-Domain Vertical Alignment) display panel 10. Of course, it may also be other types of display panels 10, such as an OLED (Organic Light-Emitting Diode) display panel 10, which is not limited here.

The present application further discloses an array substrate 30, which may be used in the display panel 10 described above. For the array substrate 30, the present application provides the following designs, and specifically describes it through several embodiments as follows.

Embodiment 1

Figure 2:
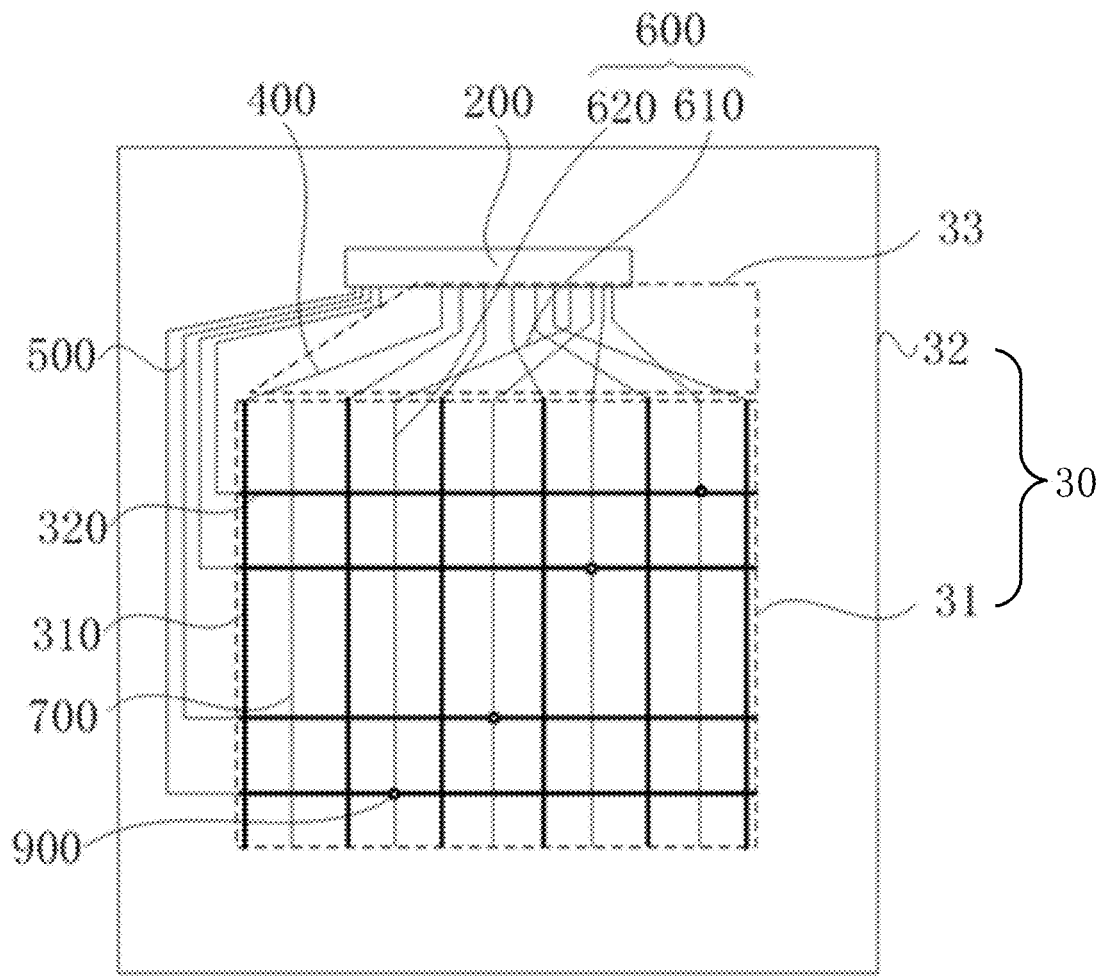
FIG. 2 is a schematic diagram of an array substrate according to a first embodiment of the present application.
Figure 3:
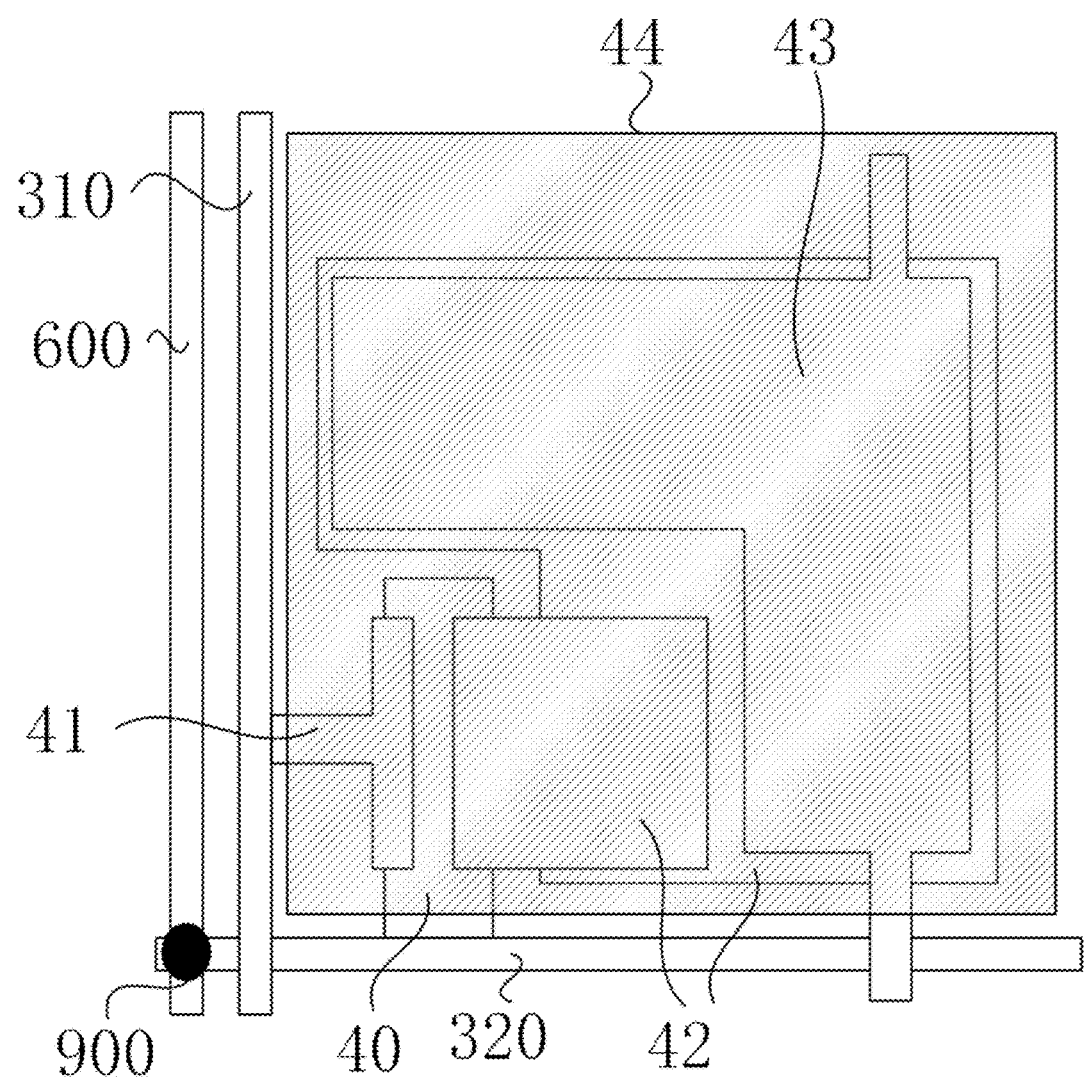
FIG. 3 is a schematic diagram illustrating a connection of a third connection line according to the first embodiment of the present application.

FIG. 2 is a schematic diagram of an array substrate according to a first embodiment of the present application. FIG. 3 is a schematic diagram illustrating a connection of a third connection line according to the first embodiment of the present application. As shown in FIGS. 2-3, the present embodiment discloses an array substrate 30. The array substrate 30 is divided into a display area 31 and a non-display area 32. The non-display area 32 is disposed around the display area 31. The array substrate 30 further includes a base, and at least one integrated driver chip 200, a plurality of data lines 310, and a plurality of scan lines 320 that are arranged on the base. The integrated driver chip 200 is located in the non-display area 32. The plurality of data lines 310 and the plurality of scan lines 320 are all arranged in the display area 31 in a criss-cross pattern, and are each connected to the integrated driver chip 200. The integrated driver chip 200 is located on one side of a length of the data line 310.

The array substrate 30 further includes a plurality of first connection lines 400, a plurality of second connection lines 500, and a plurality of third connection lines 600. The third connection lines 600 are disposed in a different layer from the scan lines 320. One end of each first connection line 400 is connected to the integrated driver chip 200, and the other end of the first connection line 400 is connected to the respective data line 310. One end of each second connection line 500 is connected to the integrated driver chip 200, and the other end of the second connection line 500 is connected to one end of the respective scan line 320. One end of each third connection line 600 is connected to the integrated driver chip 200, and the other end of the third connection line 600 is connected to another end of the respective scan line 320. Each of the scan lines 320 is connected to one of the second connection lines 500 and one of the third connection lines 600.

The non-display area 32 includes a fan-out area 33. The fan-out area 33 is located between the integrated driver chip 200 and the display area 31. The first connection lines 400 are located in the fan-out area 33. The second connection lines 500 are entirely located in the non-display area 32. Each of the third connection lines 600 is partially located in the fan-out area 33, and the other part of the third connection line 600 is located in the display area 31.

It is possible that all the second connection lines 500 are connected to the left side of the corresponding scan lines 320, and all the third connection lines 600 are connected to the right side of the corresponding scan lines 320. Alternatively, all the second connection lines 500 are connected to the right side of the corresponding scan lines 320, and all the third connection lines 600 are connected to the left side of the corresponding scan lines 320.

The integrated driver chip 200 integrates the source driver chip connected to the data lines 310 and the gate driver chip connected to the scan lines 320. The integrated driver chip 200 has both source driver chip pins and gate driver chip pins. The data lines 310 and the scan lines 320 are all connected to the integrated driver chip 200.

The array substrate 30 further includes an active switch. The active switch includes a gate electrode 40, a source electrode 41, a drain electrode 42, a common electrode 43, and a pixel electrode 44. The gate electrode 40 is connected to the respective scan line 320. The source electrode 41 is connected to the respective data line 310. One side of the drain electrode 42 is connected to the respective pixel electrode 44, and the other side of the drain electrode 42 is connected to the respective source 41 through a semiconductor layer. A storage capacitor is formed between the common electrode 43 and the drain electrode 42.

Compared with the solution that the connection lines on both sides of the scan line 320 of the array substrate 30 are located in the non-display area 32, the present application disposes the connection line for the other part of the scan line 320, namely the third connection line 600, in the fan-out area 33 and the display area, thus reducing the size of the non-display area 32 of the array substrate 30, thereby achieving an ultimate borderless effect. By disposing the connection line for one part of the scan line 320, namely the second connection line 500, in the non-display area 32, it is avoided that all the connection lines are located in the fan-out area 33 and the display area 31 to reduce the interference with the first connection lines 400, thus ensuring the normal transmission of signals.

Dual-sided driving means that both sides of the scan line 320 are connected to the integrated driver chip 200. The third connection line 600 includes a fan-out portion 610 and an in-plane portion 620. The two ends of the fan-out portion 610 are respectively connected to the integrated driver chip 200 and the in-plane portion 620. The in-plane portion 620 is connected to the corresponding scan line 320 through a via hole 900. The fan-out portion 610 is located in the fan-out area 33, and the in-plane portion 620 is located in the display area 31. The in-plane portion 620 of each of the third connection lines 600 is equal in length. The in-plane portion 620 of the third connection line 600 has a same length as the data line 310.

The array substrate 30 further includes a floating line 700. The floating line 700 is disposed on the base 100 and is located in the display area 31, and the floating line 700 runs parallel to the data line 310. The floating line 700 is located between two adjacent data lines 310, and the distance between the floating line 700 and the adjacent data line 310 is d2.

The in-plane portion 620 of the third connection line 600 is arranged in parallel with the data line 310, and the in-plane portion 620 is located between two adjacent data lines 310. The distance between the in-plane portion 620 and the adjacent data line 310 is d3, and d2 is equal to d3. Only the floating line 700 or only the in-plane portion 620 of the third connection line 600 is disposed between two adjacent data lines 310.

In the present application, the in-plane portion 620 of the third connection line 600 is set to have the same length as the data line 310, and a floating line 700 is disposed at a position between two adjacent data lines 310 where the in-plane portion 620 of the third connection line 600 is not disposed. Furthermore, the in-plane portion 620, the data line 310, and the floating line 700 are all arranged equidistantly to ensure the uniformity of the electric field in the display area 31 and avoid affecting the display effect.

The in-plane portions 620 of the plurality of third connection lines 600 may be arranged equidistantly within the display area 31. Since the third connection line 600 needs to transfer the data in the integrated driver chip 200 to the scan line 320, arranging the in-plane portion 620 capable of data transmission at equal intervals in the display area 31 can further improve the uniformity of the electric field in the display area 31.

Alternatively, it is also possible that some of the second connection lines 500 are connected to the left parts of the scan lines 320, and the others of the second connection lines 500 are connected to the right parts of the scan lines 320; some of the third connection lines 600 are connected to the left parts of the scan lines 320, and the others of the third connection lines 600 are connected to the right parts of the scan lines 320, as follows.

Figure 4:
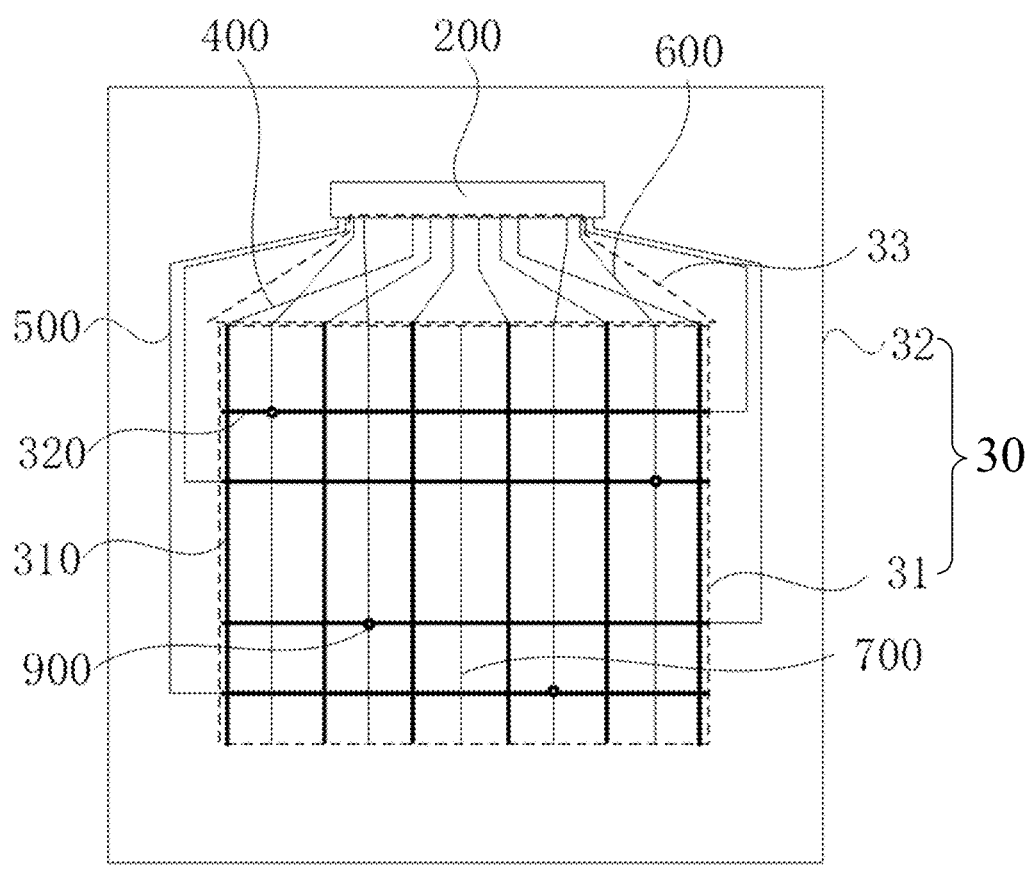
FIG. 4 is a schematic diagram of a second connection line according to the first embodiment of the present application.

FIG. 4 is a schematic diagram of a second connection line according to the first embodiment of the present application. As shown in FIG. 4, the left end of the scan line 320 of an odd-numbered line is connected to the third connection line 600, and the right end of the scan line 320 of the odd-numbered line is connected to the second connection line 500; the left end of the scan line 320 of an even-numbered line is connected to the second connection line 500, and the right end of the scan line 320 of the even-numbered line is connected to the third connection line 600. Alternatively, the left end of the scan line 320 of an even-numbered line is connected to the third connection line 600, and the right end of the scan line 320 of the even-numbered line is connected to the second connection line 500; the left end of the scan line 320 of the odd-numbered line is connected to the second connection line 500, and the right end of the scan line 320 of the odd-numbered line is connected to the third connection line 600.

Thus, the number of second connection lines 500 in the non-display area 32 on the left side of the scan lines 320 is equal to the number of second connection lines 500 in the non-display area 32 on the right side of the scan lines 320, thereby reducing the density of the second connection lines 500 on the non-display area 32 and thus reducing the size of the non-display area 32.

Embodiment 2

Figure 5:
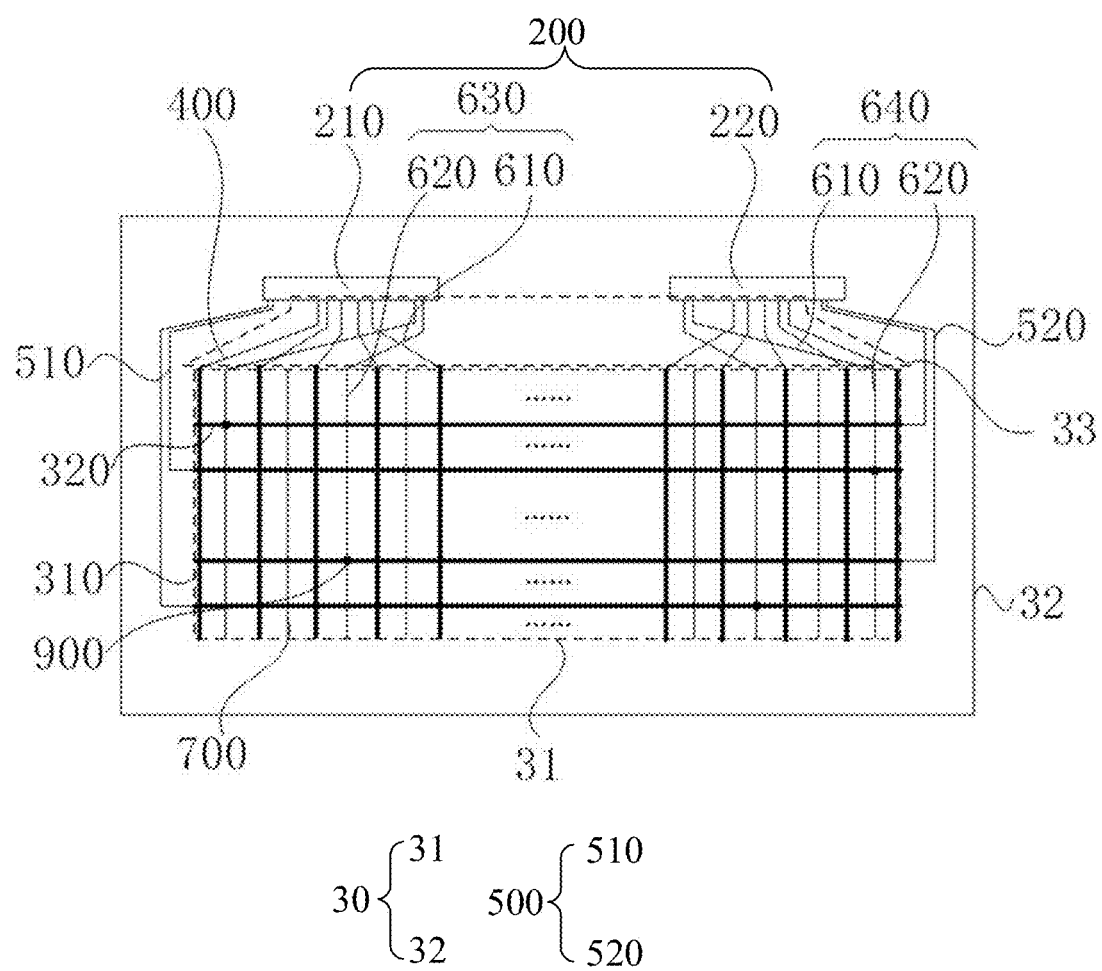
FIG. 5 is a schematic diagram of an array substrate according to a second embodiment of the present application.

FIG. 5 is a schematic diagram of an array substrate according to a second embodiment of the present application. As shown in FIG. 5, unlike the first embodiment, the present embodiment includes two integrated driver chips 200, and the two integrated driver chips 200 are respectively located on the left and right sides at a same side of a length of the data line 310.

That is, the array substrate 30 includes two integrated driver chips 200, namely, the first sub-integrated driver chip 210 and the second sub-integrated driver chip 220. The plurality of second connection lines 500 are divided into second left connection lines 510 and second right connection lines 520. The plurality of third connection lines 600 are divided into third left connection lines 630 and third right connection lines 640.

One end of the second right connection line 520 is connected to the second sub-integrated driver chip 220, and the other end of the second right connection line 520 is connected to one end of the scan line 320 of an odd row. One end of the third left connection line 630 is connected to the first sub-integrated driver chip 210, and the other end of the third left connection line 630 is connected to the other end of the scan line 320 of the odd row. Each scan line 320 of the odd row is connected to one second right connection line 520 and one third left connection line 630.

One end of the second left connection line 510 is connected to the first sub-integrated driver chip 210, and the other end is connected to one end of the scan line 320 of an even-numbered row. One end of the third right connection line 640 is connected to the second sub-integrated driver chip 220, and the other end is connected to the other end of the scan line 320 of the even-numbered row. Each scan line 320 of the even-numbered row is connected to one second left connection line 510 and one third right connection line 640.

Compared with the dual-sided driving solution, it is not needed to set the same number of connection lines as that of the scan lines 320 in the non-display area 32 on each of both sides of the scan lines 320. For example, if the number of the scan lines 320 is 1080, only 540 connection lines need to be disposed in the non-display area 32 on the left side of the scan lines 320, and only 540 connection lines need to be disposed in the non-display area 32 on the right side of the scan lines 320. Thus, the area of the non-display area 32 of the display panel 10 is greatly reduced.

Furthermore, the two ends of the third left connection line 630 are respectively connected to the left end of the odd-numbered scan line 320 and the first sub-integrated driver chip 210 on the left side, and the two ends of the second right connection line 520 are respectively connected to the right end of the odd-numbered scan line 320 and the second sub-integrated driver chip 220 on the right side; the two ends of the third right connection line 640 are respectively connected to the right end of the even-numbered scan line 320 and the second sub-integrated driver chip 220 on the right side, and the two ends of the second left connection line 510 are respectively connected to the left end of the even-numbered scan line 320 and the first sub-integrated driver chip 210 on the left side.

Thereby, the third left connection line 630 connected to the left end of the odd-numbered scan line 320 can be shorter and can be connected to the left end of the odd-numbered scan line 320 as much as possible, and the second right connection line 520 connected to the right end of the odd-numbered scan line 320 can be shorter and is directly connected to the right end of the scan line 320 of the odd row; the second connection line 500 connected to the left end of the even-numbered scan line 320 can be shorter and directly connected to the left end of the even-numbered scan line 320, and the third connection line 600 connected to the right end of the even-numbered scan line 320 can be shorter and can be connected to the right end of the even-numbered scan line 320 as much as possible.

The length of the third left connection line 630 connected to the scan line 320 of the previous odd line is greater than the length of the third left connection line 630 connected to the scan line 320 of the present odd line. The length of the third right connection line 640 connected to the scan line 320 of the previous even line is greater than the length of the third right connection line 640 connected to the scan line 320 of the present even line.

That is, of two adjacent odd or even scan lines 320, the line lengths of the third connection lines 600 respectively connected to the scan lines 320 decrease in a direction from top to bottom. Taking the odd-numbered scan lines 320 as an example, the lengths of the second connection lines 500 connected to the respective scan lines 320 gradually increase in the direction of getting farther away from the integrated driver chip 200. Therefore, the lengths of the third connection lines 600 connected to the respective scan lines 320 gradually decrease in the direction of getting farther away from the integrated driver chip 200 to balance the impedance difference caused by the length differences of the second connection lines 500.

Further, let the sum of the lengths of the second connection line 500 and the third connection line 600 that are respectively connected to both ends of the scan line 320 of the current row be d1. Let the sum of the length of the second connection line 500 and the third connection line 600 respectively connected to both ends of the scan line 320 of any other row is d2. Then the difference between d1 and d2 is 0-0.5 mm. That is, the sum of the lengths of the second connection line 500 and the third connection line 600 connected on both sides of each scan line 320 is ensured to differ by 0-0.5 mm, thereby avoiding the problem of insufficient voltage at the scan line 320 relatively far away from the integrated driver chip 200.

The second left connection lines 510 are all connected to the left side of the first sub-integrated driver chip 210. The third left connection lines 630 are all connected to the right side of the first sub-integrated driver chip 210. The second right connection lines 520 are all connected to the right side of the second sub-integrated driver chip 220. The third right connection lines 640 are all connected to the left side of the second sub-integrated driver chip 220. Some of the first connection lines 400 are connected to the first sub-integrated driver chip 210 and connected to a middle portion of the first sub-integrated driver chip 210. The others of the first connection lines 400 are connected to the second sub-integrated driver chip 220 and connected to a middle portion of the second sub-integrated driver chip 220.

Of course, in order to reduce the cross-line problem of the third connection line 600 and the first connection line 400 in the fan-out area 33, the present application has made further improvements, that is, the third connection line 600 is disposed between two adjacent first connection lines 400.

Figure 6:
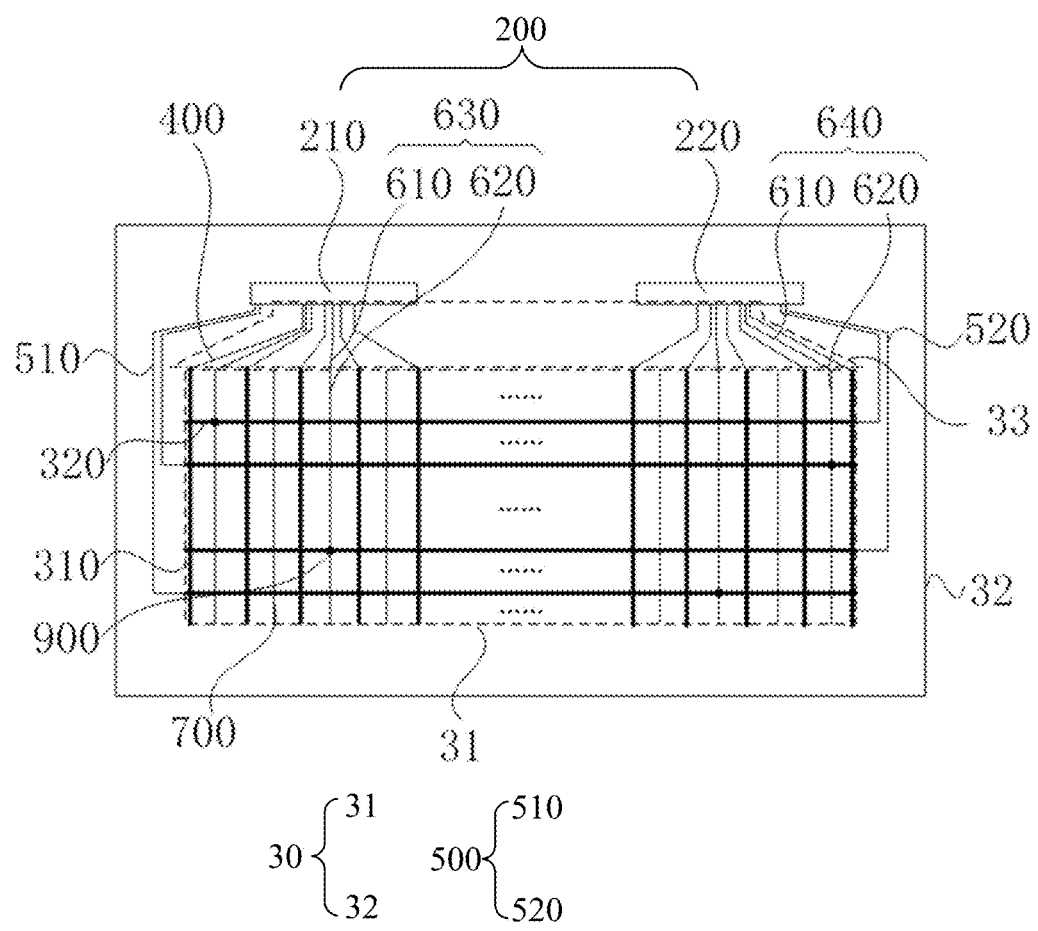
FIG. 6 is a schematic diagram of a third connection line according to the second embodiment of the present application.

FIG. 6 is a schematic diagram of a third connection line according to the second embodiment of the present application. As shown in FIG. 6, the third connection line 600 includes a fan-out portion 610 and an in-plane portion 620. The two ends of the fan-out portion 610 are respectively connected to the integrated driver chip 200 and the in-plane portion 620. The in-plane portion 620 is connected to the corresponding scan line 320 through a via hole 900. The fan-out portion 610 is located in the fan-out area 33. The in-plane portion 620 is located in the display area 31.

The fan-out portion 610 of the third connection line 600 is disposed between two adjacent first connection lines 400. The in-plane portion 620 of the third connection line 600 is disposed between two adjacent data lines 310. Thus, the fan-out portion 610 of the third connection line 600 does not overlap the first connection line 400, reducing the coupling capacitance between different signals on the data line 310 and the scan line 320, and further improving the display effect.

In this case, since the third connection line 600 and the first connection line 400 do not overlap, the third connection line 600 and the first connection line 400 may be disposed in the same layer.

Figure 7:
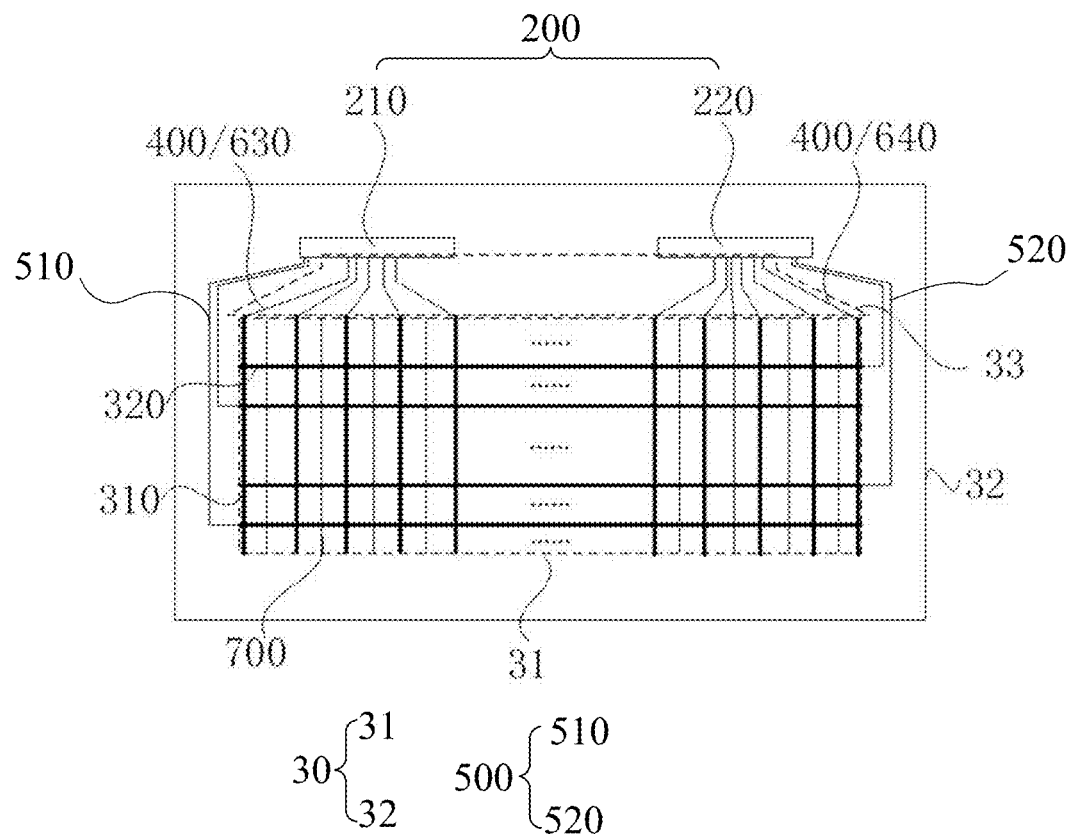
FIG. 7 is a schematic diagram of the third connection line disposed under the first connection line according to the second embodiment of the present application.
Figure 8:
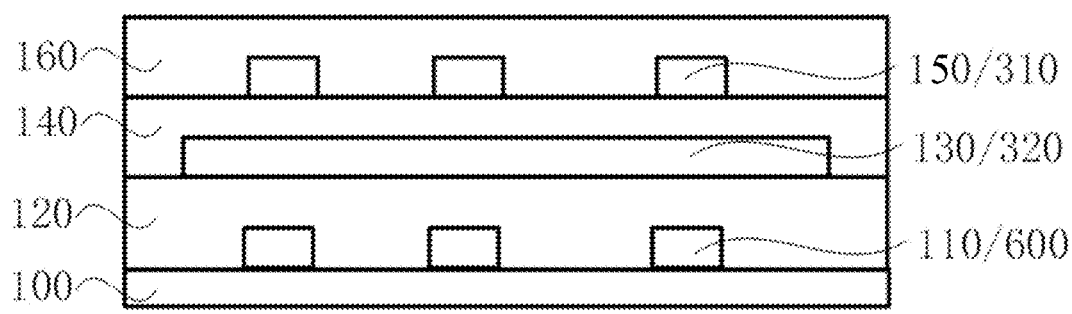
FIG. 8 is a cross-sectional view in which the third connection line is disposed under the first connection line according to the second embodiment of the present application.

Of course, the third connection line 600 and the first connection line 400 may also be disposed in different layers. FIG. 7 is a schematic diagram illustrating a third connection line disposed under the first connection line in the second embodiment of the present application. FIG. 8 is a cross-sectional view of a third connection line disposed under the first connection line in the second embodiment of the present application. As shown in FIGS. 7-8, when the first connection line 400 and the third connection line 600 are disposed in different layers, the third connection line 600 may also be disposed under the first connection line 400. Specifically, the third connection line 600 and the second connection line 500 are disposed in different layers, and a projection of the fan-out portion 610 of the third connection line 600 on the base 100 overlaps or coincides with a projection of the second connection line 500 on the base 100. A projection of the in-plane portion 620 of the third connection line 600 on the base 100 overlaps or coincides with a projection of the data line 310 on the base 100.

In this case, when the end of the third connection line 600 facing away from the scan line 320 is connected to the integrated driver chip 200, only one connection wire needs to be led out from the corresponding connection solder joint. By disposing the third connection line 600 below the first connection line 400, the height of the first connection line 400 of the fan-out area 33 can be raised, so that the groove formed between the two adjacent first connection lines 400 is deeper, and when the alignment liquid is coated on the array substrate 30, the groove has a better drainage effect on the alignment liquid.

Furthermore, the third connection line 600 may be connected to the end of the scan line 320 as much as possible, so as to avoid the situation that the scan line 320 at the end is disconnected and the signal cannot be transmitted, thereby improving the reliability of the array substrate 30.

Exemplarily, the array substrate 30 includes a first metal layer 110, a first insulating layer 120, a second metal layer 130, a second insulating layer 140, a third metal layer 150, and a third insulating layer 160 sequentially deposited on the base 100. The third connection line 600 is located in the first metal layer 110. The scan line 320 is located in the second metal layer 130. The second connection line 500 is located in the second metal layer 130. The data line 310 is located in the third metal layer 150. The first connection line is located in the third metal layer 150.

Figure 9:
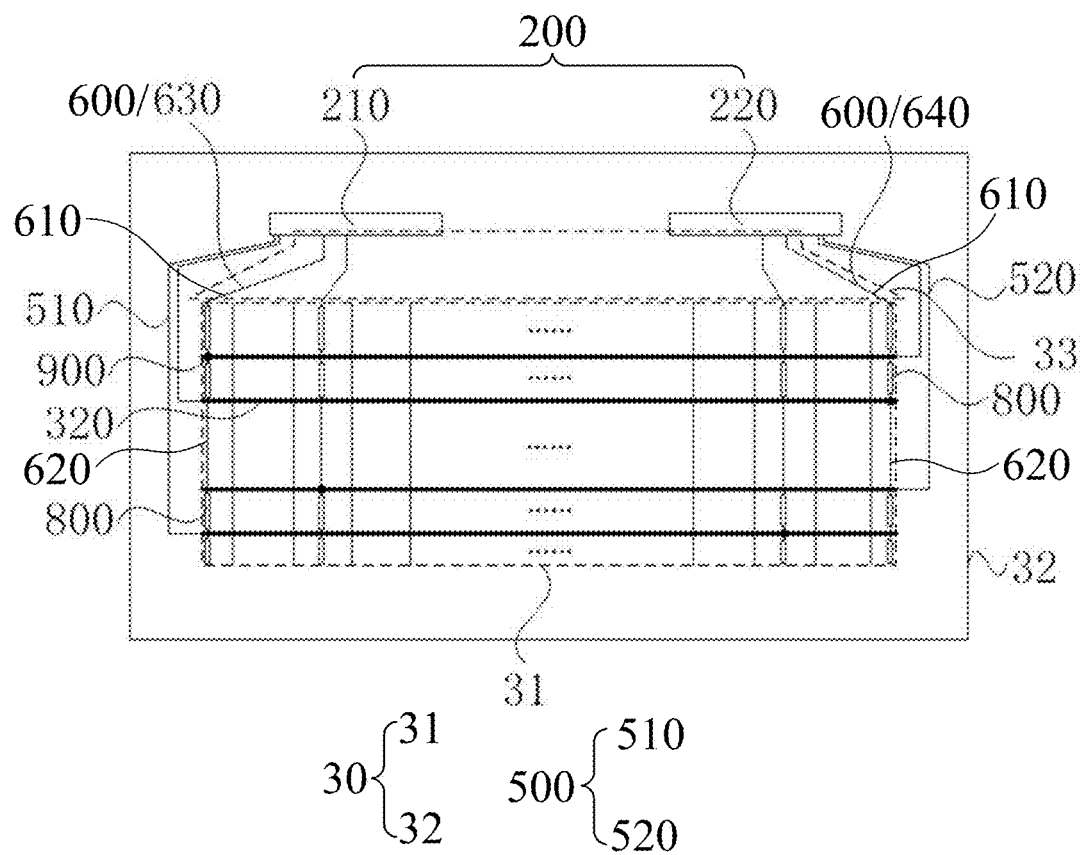
FIG. 9 is a schematic diagram of a metal line segment according to the second embodiment of the present application.
Figure 10:
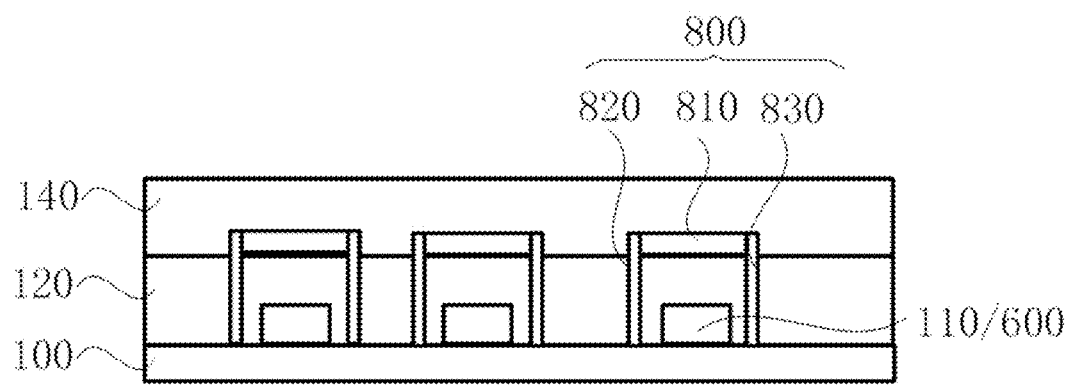
FIG. 10 is a cross-sectional view of a metal line segment according to the second embodiment of the present application.

In order to avoid the parasitic capacitance caused by the vertical overlap or coincidence of the first connection line 400 and the third connection line 600, the present application further adds a metal line segment 800. FIG. 9 is a schematic diagram of a metal line segment according to the second embodiment of the present application. FIG. 10 is a cross-sectional view of a metal line segment according to the second embodiment of the present application. As shown in FIGS. 9-10, the present embodiment further provides a plurality of metal line segments 800 disposed on the array substrate 30. Each metal line segment 800 is not connected to any other metal line segment 800. The metal line segments 800 are located in the second metal layer 130. Each metal line segment 800 is located between two adjacent scan lines 320 and is not connected to the scan lines 320. A projection of the third connection line 600 on the base 100 overlaps or coincides with a projection of the metal line segment 800 on the base 100.

The metal line segment 800 acts as a shielding electrode, thereby avoiding the generation of parasitic capacitance between the first connection line and the fan-out portion of the third connection line 600, and also avoiding the generation of parasitic capacitance between the in-plane portion 620 of the third connection line 600 and the data line, thereby ensuring that the signal transmission is not affected.

Further, the metal line segment 800 includes a main body 810, a first side wall 820, and a second side wall 830. The first side wall 820 and the second side wall 830 are respectively connected to both sides of the main body 810 in the width direction. A cross section of the metal line segment 800 along the width direction is in the shape of a square free of the lower side. The first insulating layer 120 defines a first through groove and a second through groove on both sides in the width of the metal line segment 800. The first side wall 820 is located in the first through groove, and the second side wall 830 is located in the second through groove. The spacing between the first side wall 820 and the second side wall 830 is greater than the line width of the data line and also greater than the line width of the first connection line. Thus, the third connection line 600 is isolated from the first connection line and the data line to avoid generating lateral capacitance.

It should be noted that the inventive concept of the present application can be formed into many embodiments, but the length of the application document is limited and so these embodiments cannot be enumerated one by one. The technical features can be arbitrarily combined to form a new embodiment, and the original technical effect may be enhanced after the various embodiments or technical features are combined.

The foregoing description is merely a further detailed description of the present application made with reference to some specific illustrative embodiments, and the specific implementations of the present application will not be construed to be limited to these illustrative embodiments. For those having ordinary skill in the technical field to which this application pertains, numerous simple deductions or substitutions may be made without departing from the concept of this application, which shall all be regarded as falling in the scope of protection of this application.

What is claimed is:

1. An array substrate, being divided into a display area and a non-display area; wherein the array substrate comprises a base, and at least one integrated driver chip, a plurality of data lines, and a plurality of scan lines that are arranged on the base; wherein the integrated driver chip is disposed in the non-display area; wherein the plurality of data lines and the plurality of scan lines are arranged in a crisscross pattern in the display area, and are each connected to the integrated driver chip;

wherein the array substrate further comprises a plurality of first connection lines, a plurality of second connection lines, and a plurality of third connection lines; wherein the plurality of third connection lines are disposed in a different layer than the plurality of scan lines;

wherein one end of each of the plurality of first connection lines is connected to the integrated driver chip, and another end of the first connection line is connected to the respective data line; wherein one end of each of the plurality of second connection lines is connected to the integrated driver chip, and another end of the second connection line is connected to one end of the respective scan line; wherein one end of each of the plurality of third connection lines is connected to the integrated driver chip, and another end of the third connection line is connected to another end of the respective scan line; wherein each of the plurality of scan lines is connected to one respective second connection line and one respective third connection line;

wherein the non-display area comprises a fan-out area disposed between the integrated driver chip and the display area; wherein each of the plurality of second connection lines is entirely disposed in the non-display area; wherein each of the plurality of third connection lines is partially disposed in the fan-out area, and wherein another part of the third connection line is disposed in the display area.

2. The array substrate as recited in claim 1, wherein each of the plurality of third connection lines comprises a fan-out portion and an in-plane portion, wherein two ends of the fan-out portion are connected to the integrated driver chip and the in-plane portion respectively, and wherein the in-plane portion is connected to the respective scan line through a via hole; wherein the fan-out portion is disposed in the fan-out area, and wherein the in-plane portion is disposed in the display area;

wherein the in-plane portion of each of the plurality of third connection lines has an equal length, and wherein the in-plane portion of each of the plurality of third connection lines has an equal length to that of each of the plurality of data lines;

wherein the array substrate further comprises a floating line, which is arranged on the base and located in the display area and is oriented parallel to each of the plurality of data lines; wherein the floating line is located between respective two adjacent data lines, and a distance between the floating line and each adjacent data line is d2;

wherein the in-plane portion of each of the plurality of third connection lines is arranged in parallel with each of the plurality of data lines, and the in-plane portion is located between respective two adjacent data lines, and a distance between the in-plane portion and each adjacent data line is d3, wherein d2 is equal to d3;

wherein there is disposed only the floating line or only the in-plane portion of the third connection line between every two adjacent data lines.

3. The array substrate as recited in claim 2, wherein the in-plane portions of the plurality of third connection lines are arranged equidistantly within the display area.

4. The array substrate as recited in claim 2, wherein the plurality of third connection lines are disposed in a different layer than the plurality of first connection lines; wherein a projection of the fan-out portion of each of the plurality of third connection lines on the base overlaps or coincides with a projection of the respective first connection line on the base;

wherein a projection of the in-plane portion of each of the plurality of third connection lines on the base overlaps or coincides with a projection of the respective data line on the base.

5. The array substrate as recited in claim 4, wherein the array substrate comprises a first metal layer, a first insulating layer, a second metal layer, a second insulating layer, a third metal layer, and a third insulating layer that are sequentially deposited on the base;

wherein the plurality of third connection lines are disposed in the first metal layer, the plurality of scan lines are disposed in the second metal layer; wherein the plurality of second connection lines are located in the second metal layer, the plurality of data lines are located in the third metal layer, and the plurality of first connection lines are located in the third metal layer;

wherein the array substrate further comprises a plurality of metal line segments disposed in the second metal layer; wherein each of the plurality of metal line segments are located between respective two adjacent scan lines and are not connected to the plurality of scan lines; wherein a projection of each of the plurality of third connection lines on the base overlaps or coincides with a projection of the respective metal line segment on the base.

6. The array substrate as recited in claim 5, wherein each of the plurality of metal line segments comprises a main body, a first side wall, and a second side wall;

wherein the first side wall and the second side wall are respectively connected to two sides of the main body in a width of the main body;

wherein a cross section of each of the plurality of metal line segments along a width orientation is in the shape of a square without a lower side; wherein the first insulating layer defines a first through groove and a second through groove at two sides in a width of each of the plurality of metal line segments, wherein the first side wall of the metal line segment is located in the respective first through groove, and the second side wall of the metal line segment is located in the respective second through groove; wherein a spacing between the first side wall and the second side wall is greater than a line width of each of the plurality of data lines and also greater than a line width of each of the plurality of first connection lines.

7. The array substrate as recited in claim 1, wherein the array substrate comprises two integrated driver chip comprising a first sub-integrated driver chip and a second sub-integrated driver chip; wherein the plurality of second connection lines are divided into a plurality of second left connection lines and a plurality of second right connection lines; wherein the plurality of third connection lines are divided into a plurality of third left connection lines and a plurality of third right connection lines;

wherein one end of each of the plurality of second right connection lines is connected to the second sub-integrated driver chip, and another end of the second right connection line is connected to one end of the respective scan line of an odd-numbered row; one end of each of the plurality of third left connection lines is connected to the first sub-integrated driver chip, and another end of the third left connection line is connected to another end of the respective scan line of the odd-numbered row; wherein the scan line of each odd-numbered row is connected to one respective second right connection line and one respective third left connection line;

wherein one end of each of the plurality of second left connection lines is connected to the first sub-integrated driver chip, and another end of the second left connection line is connected to one end of the respective scan line of an even-numbered row; one end of each of the plurality of third right connection lines is connected to the second sub-integrated driver chip, and another end of the third right connection line is connected to another end of the respective scan line of the even-numbered row; wherein the scan line of each even-numbered row is connected to one respective second left connection line and one respective third right connection line.

8. The array substrate as recited in claim 7, wherein a length of the third left connection line connected to the scan line of a previous odd-numbered row is greater than a length of the third left connection line connected to the scan line of a current odd-numbered row;

wherein a length of the third right connection line connected to the scan line of a previous even-numbered row is greater than a length of the third right connection line connected to the scan line of a current even-numbered row.

9. The array substrate as recited in claim 8, wherein let a sum of lengths of the second connection line and the third connection line that are respectively connected to two ends of the scan line of the current row be d1, and let a sum of lengths of the second connection line and the third connection line that are respectively connected to two ends of the scan line of each other row be d2, then a difference between d1 and d2 lies in the range of 0-0.5 mm.

10. The array substrate as recited in claim 7, wherein each of the plurality of third connection lines comprises a fan-out portion and an in-plane portion; wherein two ends of the fan-out portion are connected to the integrated driver chip and the in-plane portion respectively, and wherein the in-plane portion is connected to the respective scan line through a via hole;

wherein the fan-out portion is disposed in the fan-out area, and the in-plane portion is disposed in the display area;

wherein the fan-out portion of each of the plurality of third connection lines is disposed between respective two adjacent first connection lines, and wherein the in-plane portion of each of the plurality of third connection lines is disposed between respective two adjacent data lines.

11. The array substrate as recited in claim 7, wherein the two integrated driver chips are respectively located on a left and a right side to a same side in a length of each of the plurality of data lines.

12. The array substrate as recited in claim 7, wherein each of the plurality of second left connection lines is connected to a left side of the first sub-integrated driver chip, and each of the plurality of third left connection lines is connected to a right side of the first sub-integrated driver chip; wherein each of the plurality of second right connection lines is connected to a right side of the second sub-integrated driver chip, and each of the plurality of third right connection lines is connected to a left side of the second sub-integrated driver chip;
   wherein a part of the plurality of first connection lines is each connected to the first sub-integrated driver chip and connected to a middle portion of the first sub-integrated driver chip; wherein another part of the plurality of first connection lines is connected to the second sub-integrated driver chip and connected to a middle portion of the second sub-integrated driver chip.

13. The array substrate as recited in claim 1, wherein each of the plurality of second connection lines is connected to a left side of the respective scan line, and wherein each of the plurality of third connection lines is connected to a right side of the respective scan line.

14. The array substrate as recited in claim 1, wherein each of the plurality of second connection lines is connected to a right side of the respective scan line, and wherein each of the plurality of third connection lines is connected to a left side of the respective scan line.

15. The array substrate as recited in claim 1, wherein the integrated driver chip comprises both source driver chip pins and gate driver chip pins, and wherein the plurality of data lines and the plurality of scan lines are each connected to the integrated driver chip.

16. The array substrate as recited in claim 1, further comprising an active switch, wherein the active switch comprises a gate electrode, a source electrode, a drain electrode, a common electrode, and a pixel electrode; wherein the gate electrode is connected to the respective scan line; the source electrode is connected to the respective data line; wherein one side of the drain electrode respective is connected to the respective pixel electrode, and another side of the drain electrode is connected to the source electrode through a semiconductor layer, wherein a storage capacitor is formed between the common electrode and the drain electrode.

17. The array substrate as recited in claim 1, wherein a part of the plurality of second connection lines is each connected to a left portion of the respective scan line, wherein another part of the plurality of second connection lines is each connected to a right portion of the respective scan line; wherein a part of the plurality of third connection lines is each connected to a left portion of the respective scan line, and wherein another part of the plurality of third connection lines is each connected to the right portion of the respective scan line.

18. The array substrate as recited in claim 17, wherein a left end of each of the plurality of scan lines in an odd-numbered row is connected to the respective third connection line, and a right end of the scan line in the odd-numbered row is connected to the respective second connection line; wherein a left end of each of the plurality of scan lines in an even-numbered row is connected to the respective second connection line, and a right end of the scan line in the even-numbered row is connected to the respective third connection line.

19. The array substrate as recited in claim 17, wherein a left end of each of the plurality of scan lines in an even-numbered row is connected to the respective third connection line, and a right end of the scan line in the even-numbered row is connected to the respective second connection line; wherein a left end of each of the plurality of scan lines in an odd-numbered row is connected to the respective second connection line, and a right end of the scan line in the odd-numbered row is connected to the respective third connection line.

20. A display panel, comprising an opposing substrate and an array substrate, wherein the opposing substrate is arranged opposite to the array substrate;
   wherein the array substrate is divided into a display area and a non-display area; wherein the array substrate comprises a base, and at least one integrated driver chip, a plurality of data lines, and a plurality of scan lines that are arranged on the base; wherein the integrated driver chip is disposed in the non-display area; wherein the plurality of data lines and the plurality of scan lines are arranged in a crisscross pattern in the display area, and are each connected to the integrated driver chip;
   wherein the array substrate further comprises a plurality of first connection lines, a plurality of second connection lines, and a plurality of third connection lines; wherein the plurality of third connection lines are disposed in a different layer than the plurality of scan lines;
   wherein one end of each of the plurality of first connection lines is connected to the integrated driver chip, and another end of the first connection line is connected to the respective data line; wherein one end of each of the plurality of second connection lines is connected to the integrated driver chip, and another end of the second connection line is connected to one end of the respective scan line; wherein one end of each of the plurality of third connection lines is connected to the integrated driver chip, and another end of the third connection line is connected to another end of the respective scan line; wherein each of the plurality of scan lines is connected to one respective second connection line and one respective third connection line;
   wherein the non-display area comprises a fan-out area disposed between the integrated driver chip and the display area; wherein each of the plurality of second connection lines is entirely disposed in the non-display area; wherein each of the plurality of third connection lines is partially disposed in the fan-out area, and wherein another part of the third connection line is disposed in the display area.

* * * * *